United States Patent
Sugisaki et al.

[11] Patent Number: 5,305,172
[45] Date of Patent: Apr. 19, 1994

[54] SYNTHETIC RESIN DISC CARTRIDGE SHUTTER HAVING NON-ENGAGING RAISED GATE MARK

[75] Inventors: Tsutomu Sugisaki; Kazutoshi Machida; Ikuo Taki; Naoyoshi Chino; Tadashi Irie, all of Kanagawa, Japan

[73] Assignee: Fjui Photo Film Co., Ltd., Kanagawa, Japan

[21] Appl. No.: 978,854

[22] Filed: Nov. 19, 1992

Related U.S. Application Data

[62] Division of Ser. No. 757,422, Sep. 10, 1991.

[30] Foreign Application Priority Data

Sep. 11, 1990 [JP] Japan .................. 2-94734[U]
Oct. 19, 1990 [JP] Japan .................. 2-282813

[51] Int. Cl.$^5$ ............................................. G11B 23/03
[52] U.S. Cl. ............................................. 360/133
[58] Field of Search .................................. 360/133

[56] References Cited

U.S. PATENT DOCUMENTS 5,084,862 1/1992 Fujita .................. 360/133

*Primary Examiner*—A. J. Heinz
*Attorney, Agent, or Firm*—Sughrue, Mion, Zinn, Macpeak & Seas

[57] ABSTRACT

A cartridge including a cartridge case having a disc-shaped recording medium received therein so as to allow predetermined information signals to be recorded and reproduced, and a shutter molded of a synthetic resin to slidably open and close an opening portion formed on the cartridge case so as to allow at least a part of the disc-shaped recording medium to be exposed to the outside. In accordance with the present invention, the shutter is composed of an upper main plate, a lower main plate and a coupling plate which connects the upper main plate to the lower main plate via the coupling plate in an integrally molded state while having an U-shaped cross-sectional contour to hold the cartridge case in a clamped state. A gate used for performing a molding operation is formed on the outer surface of the side plate, with the position of the gate being determined such that it always remains within an effective opening region corresponding to the opening portion. The invention also provides a method for producing the shutter.

3 Claims, 3 Drawing Sheets

SYNTHETIC RESIN DISC CARTRIDGE SHUTTER HAVING NON-ENGAGING RAISED GATE MARK

This is a divisional of application Ser. No. 07/757,422 filed Sep. 10, 1991.

BACKGROUND OF THE INVENTION

The present invention relates to a method of forming a plastic molded article, and more particularly to a method of forming a plastic molded article which has surfaces each of which is essentially asymmetrical between the right and left halves.

An example of a plastic molded article which has surfaces which are asymmetrical between the right and left halves is a synthetic resin shutter which is slidably engaged with the casing of a magnetic disc cartridge in such a manner as to open and close the opening which is formed in the casing so as to receive the magnetic head.

A magnetic disc cartridge, as shown in FIG. 1, includes a casing 52 in which a magnetic disc 53 is rotatably accommodated, and a shutter 56 for closing and opening an opening 54 formed in the casing 52 so as to receive the magnetic head. The shutter 56, as shown in FIGS. 1 and 2, is composed of a pair of main plates 57 which are parallel with each other and have a shutter window 60, respectively, and a coupling plate 59 through which the main plates 57 are coupled to each other. The coupling plate 59 slides along the front edge of the casing 52. That is, the shutter 56 is slidably engaged with shallow recesses 58 formed in the casing 52 near the magnetic head insertion opening 54, so that it can be moved between an opening position where the opening 54 is opened and a closing position where the opening 54 is closed.

In general, the shutter 56 is U-shaped in section, as shown in FIG. 2, and is made of metal such as stainless steel or aluminum. The shutter windows 60 which are substantially equal in size to the opening 54 of the casing 52. The shutter 56 is urged by a spring (not shown) in such a manner that normally it is set at the closed position, thereby to protect the magnetic disc and to prevent the entrance of dust or the like into the casing 52.

When the magnetic disc cartridge is in use, the shutter 56 is moved to the open position, that is, the shutter windows 60 are moved to the opening 54 to allow the insertion of the magnetic head into the opening 54.

Recently, a magnetic disc cartridge has been proposed which employs a shutter which is made of synthetic resin instead of a metal such as stainless steel.

In forming the synthetic resin shutter 56 by injection molding, the position of the gates for injection is generally at one end or both ends of the coupling plate 59, or at the middle of the latter. Since the shutter 56 is small in wall thickness, high pressure is required to form the shutter 56 by injection molding. Moreover, with the above-described conventional injection positions, the molding material is not uniformly spread in the mold cavity; that is, first the central portion, becoming high in pressure, is filled with the material, and thereafter the remaining portions around the central portion are filled with the material. Thus, the injected material is liable to be non-uniform in thickness and include shrinkage cavities.

Although a difficulty encountered in the formation of the shutter of the magnetic disc cartridge has been described, it should be noted that the same difficulty is generally involved in the formation of plastic products which have surfaces which are asymmetric between right and left halves.

The present invention further relates generally to a disc cartridge. More particularly, the present invention relates to a disc cartridge including a shutter slidably mounted on a cartridge case in which a disc-shaped recording medium is received, and to a method for producing such a disc cartridge.

In view of convenience during practical use and reliable protection from dust or similar foreign material, a disc-shaped recording medium such as a magnetic disc, optical disc, photomagnetic disc or the like is constructed such that it is loaded in a recording/reproducing apparatus as it is received in a comparatively rigid cartridge case so as to allow desired information to be recorded or reproduced.

A 3.5 inch micro floppy disc cartridge as shown in FIG. 3 has been hitherto known as a cartridge of the foregoing type. Specifically, a cartridge 21 is constructed such that a magnetic disc 5 is rotatably received in rectangular upper and lower half shells 2 and 3 molded of an acrylonitrile-butadiene-styrene resin or the like. The magnetic disc 5 is a flexible magnetic recording medium which has a magnetic layer uniformly formed on the surface of a circular disc-shaped film base molded of a high molecular organic material. In addition, a ring-shaped center core 4 is fixedly fitted to a circular opening formed at the central part of the magnetic disc 5. An opening 7 is formed at the central part of the lower half shell 3 of the cartridge 21 so as to allow a motor shaft to be introduced into a substantially square motor shaft insertion hole 6 formed at the central part of the center core 4. Additionally, magnetic head insert opening portions 8 each opened forwardly of the cartridge 21 are formed on the upper and lower half shells 2 and 3 so as to allow a magnetic head and a head pad to be introduced into the magnetic head insert opening portions 8, respectively, for writing or reading a number of predetermined information using the magnetic disc 5.

To reliably prevent introduction of dust or the like into the interior of the cartridge 21 via the magnetic head insert opening portions 8 as well as adhesive deposition of the dust or the like on the magnetic disc 5, the cartridge 21 is provided with a slidable type shutter 22 for the purpose of opening and closing the magnetic head insert opening portions 8.

The shutter 22 has been hitherto formed by bending a metallic material sheet such as a stainless steel plate or the like in an U-shaped cross-sectional contour with the aid of a press or the like. The shutter 22 includes projections at the base end region thereof in such a manner that slidable displacement of the projections in the opening/closing direction of the magnetic head insert opening portions 8 is properly guided along guide grooves formed along the front edge of the lower half shell 3 on the outer surface of the same. Specifically, the shutter 22 slidably moves within a slidable displacement region 11 extending on one side surface of the cartridge 21 inclusive of the peripheral edge of each of the magnetic head insert opening portions 8. In addition, the shutter 22 is formed with an opening portion 23 which coincides in position with the magnetic head insert opening portions 8 so as to allow the magnetic disc 5 to be exposed to the outside when the cartridge 21 is in use. When the cartridge 21 is not in use, the magnetic head insert opening portions 8 are closed with the shutter 22 and the magnetic disc 5 is covered with the shutter 22, as represented by phantom lines in FIG. 3.

As stated above, in recent years, proposals have been made as to a shutter molded of a synthetic resin in an integral structure instead of the conventional shutter made from a metallic material plate as a stainless steel plate or the like, as disclosed in, e.g., Japanese Unexamined Patent Publication (Kokai) No. 60-231985 and Japanese Unexamined Patent Publication (Kokai) No. 64-70981. Each of these prior structures provides a shutter construction which assures that the shutter can easily be molded of an inexpensive resin instead of the conventional shutter made of a metallic material plate and which requires many production steps accompanied by significant production difficulties.

In a case where the shutter is molded from a synthetic resin in an integral structure, the resin flows against a large resistance due to the thin wall of the shutter during the injection molding operation, and the moldability of the molten resin is undesirably degraded because of the flow resistance itself. The problem of degraded injection moldability appears largely dependent on the position where a gate is formed for the purpose of injecting the molten resin into the hollow molding cavity used for the injection molding operation.

To obviate the foregoing problem, a proposal has been made as to a shutter wherein a gate is formed on a coupling plate 37 by way of which a main plate 35 is connected to an other main plate (located opposite to the lower plate 35). This proposal results in a raised gate mark $G_1$ appearing on the outer surface of the coupling plate 37, as shown in FIG. 3. According to this proposal, the resultant shutter has advantages that the gates can easily be formed on a molding die, the molten resin injected toward the hollow space in the mold cavity can substantially simultaneously reach the end region of the hollow space in the mold cavity, and flaws recognizable on the shutter such as stripes indicative of irregular molding or the like can be reduced.

However, it has been found that a shutter molded of a synthetic resin has a problem in that the raised gate mark $G_1$ remaining after completion of the molding operation for the shutter is located on the outer surface of the coupling plate 37, which is often incompletely treated. In addition, the foregoing problem is sometimes associated with engagement of the raised gate marks $G_1$ with a position-determining projection 41 for the cartridge 21 at the time when the cartridge 21 is loaded in a recording/reproducing apparatus. When the cartridge 21 is loaded in the recording/reproducing apparatus, it is inserted into a slot in the recording/-reproducing apparatus in the direction of the arrow D in FIG. 3. At this time, the shutter 22 is slidably displaced in such a direction that the magnetic head insert openings 8 is made to coincide in position with the opening portion 23 (in the direction of the arrow E) with the aid of an actuating member arranged in the recording/reproducing apparatus. To restrict the position where the cartridge 21 can be inserted into the slot, the coupling plate 37 is slidably displaced relative to the position-determining projection 41 disposed on the deeper side of the insertion slot of the recording/reproducing apparatus.

As the coupling plate 37 is slidably displaced in the above described manner, the raised gate mark $G_1$ is displaced such that the raised gate mark $G_1$ located leftward of the position-determining projection 41 as seen in FIG. 3 moves to a position $G_2$ located rightward of the position-determining projection 41. However, if the raised gate mark $G_1$ undesirably engages with the position-determining projection 41 in the course of the slidable displacement of the coupling plate 37, part of the raised gate mark $G_1$ is scraped, thereby producing pulverized synthetic resin. Sometimes, the opening operation of the shutter being is performed incorrectly because of the pulverized synthetic resin.

SUMMARY OF THE INVENTION

In view of the foregoing, an object of the invention is to provide a method of forming a plastic molded article which has surfaces which are asymmetrical between the right and left halves, in which, in an injection molding operation, a metal mold is uniformly filled with a synthetic resin material injected thereinto, and the material thus injected is free from the difficulty that it is not uniform in thickness and has no shrinkage cavities.

The foregoing object of the invention has been achieved by the provision of a method of forming a plastic article, such as the shutter of a magnetic disc cartridge, which has surfaces which are asymmetrical between its right and left halves, in which a synthetic resin is injected into a mold cavity from a gate which is provided on one edge of the surface which, similarly as in the coupling plate of the shutter, extends over the right and left halves of the surface, in which, according to the invention, the distance from the gate to the point on the right half of the surface which is farthest from the gate is substantially equal to the distance from the gate to the point on the left half of the surface which is farthest from the gate.

That is, in the method of the invention, the position of the gate for a plastic molded article which has surfaces which are asymmetrical between the right and left halves is determined according to the configuration of the article to be formed. That is, the position of the gate is changed to meet the condition that the distance from the gate to the point on the right half of the surface which is farthest from the gate is substantially equal to the distance from the gate to the point on the left half of the surface which is farthest from the gate.

In the above method of forming a plastic article which essentially has surfaces which are asymmetrical between right and left halves, and in which a synthetic resin is injected into a mold cavity from a gate which is provided on one edge of the surface which extends over the right and left halves of the surface, the position of the gate is so determined that the distance from the gate to the point on the right half of the surface which is farthest from the gate is substantially equal to the distance from the gate to the point on the left half of the surface which is farthest from the gate. Hence, the synthetic resin injected into the mold cavity is uniformly spread therein, so that the resultant plastic molding is uniform in thickness and free from shrinkage cavities.

Another object of the invention resides in providing a disc cartridge including a shutter molded of a synthetic resin wherein slidable displacement of the shutter in the opening direction is not obstructed, even though a raised gate mark is incompletely treated when a gate is located in position on a side plate of the shutter.

To accomplish the above object, the present invention provides a disc cartridge including a cartridge case having a disc-shaped recording medium received therein so as to allow predetermined information signals to be recorded and reproduced, as well as a shutter molded of a synthetic resin to slidably open and close an opening portion formed on the cartridge case so as to allow at least a part of the disc-shaped recording medium to be exposed to the outside, wherein the cartridge is characterized in that the shutter is composed of an upper main plate, a lower main plate and a cavity plate which connects the upper main plate to the lower main plate via the cavity plate in an integrally molded state while having an U-shaped cross-sectional contour to hold the cartridge in a clamped state, a gate used for performing a molding operation is formed on the outer surface of the coupling plate, and the position of the gate is determined such that it always remains within an effective opening region corresponding to the opening portion.

DESCRIPTION OF THE PREFERRED EMBODIMENTS

The invention will now be described in more detail with reference to preferred embodiments thereof.

In the first-described embodiment, the invention is applied to the molding of a plastic article which has surfaces which are asymmetrical between right and left halves, which article is the shutter of a magnetic disc cartridge.

Figure 1:
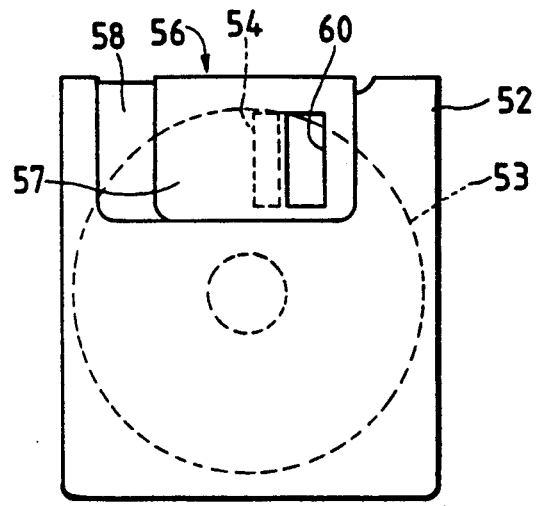
FIG. 1 is a plan view of a conventional magnetic disc cartridge.
Figure 2:
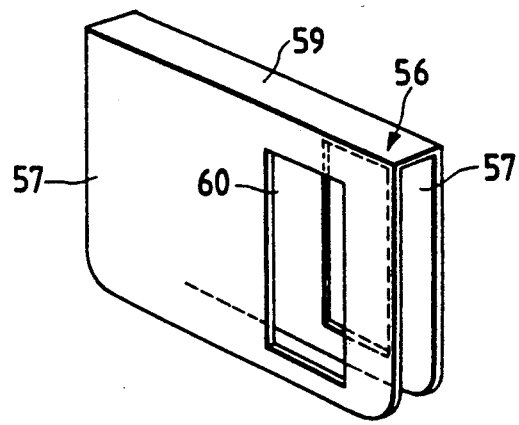
FIG. 2 is a perspective view of the shutter of FIG. 1.

That is, the shutter 56, as shown in FIG. 2, comprises: a pair of main plates 57 which are in parallel with each other and have shutter windows 60, respectively; and a coupling plate 59 through which the main plates 57 are coupled to each other. The coupling plate 59 is slid along the edge of the casing 52. That is, the shutter 56 is slidably engaged with the casing 52 of the magnetic disc cartridge (FIG. 1) to open and close the opening 54 formed in the casing 52 to receive the magnetic head. The specific feature of the shutter 56 resides in that each of the main plates 57 has the shutter window 60 as shown in FIG. 4, and therefore its configuration shows asymmetry between the right and left halves.

Figure 4:
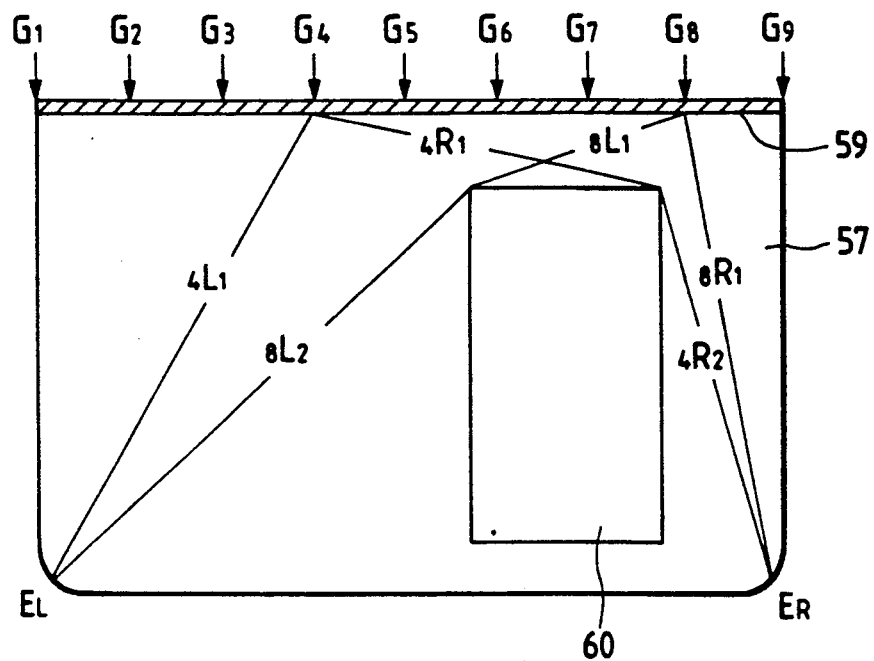
FIG. 4 is a sectional view of the shutter, taken along the longitudinal line of the shutter, of a magnetic disc cartridge, which is one example of a plastic article formed by a method of forming a plastic product according to the present invention.

In a method of forming a plastic molding according to the present invention, in forming the shutter 56 by injection molding, the injection gate is provided between gate positions $G_6$ and $G_7$ on the coupling plate 59 or near them in FIG. 4. With the gates provided in this manner, the distance between the gate and the front corner $E_R$ of the right half of the main plate 57 (hereinafter referred to as "the right front corner", when applicable) is substantially equal to the front corner $E_L$ of the left half of the same main plate 57 (hereinafter referred to as "the left front corner", when applicable).

Let us consider the case where the gate is provided at the position $G_4$ in FIG. 4. In this case, the distance between the gate $G_4$ and the left front corner $E_L$ is equal to a segment $_4L_1$ in FIG. 4, whereas the distance between the gate $G_4$ and the right front corner $E_3$ is the sum of a segment $_4R_1$ and a segment $_4R_2$. In this case, $_4L_1 < _4R_1 + _4R_2$.

In the case where the gate is provided at the position $G_8$, the distance between the gate and the left front corner $E_L$ is the sum of a segment $_8L_1$ and a segment $_8L_2$, whereas the distance between the gate and the right front corner $E_R$ is equal to a segment $_8R_1$. In this case, $_8L_1 + _8L_2 > _8R_1$.

In each of the cases where the gate is provided at the positions $G_1$ through $G_9$, the difference between the distance between the gate and the right front corner $E_R$ and the distance between the distance between the gate and the left front corner $E_L$, the external appearance, the moldability, and the molding dimensions are as evaluated below: In the following Tables 1 and 2, the mark "O" represents "excellent"; the mark "Δ", "satisfactory"; the mark "X", "unsatisfactory"; and the mark "—", "not evaluated".

The following Table 1 indicates the results of evaluation in the case where a synthetic resin material with MI (melt index)=25 was injected into the metal mold. The term "MI" as used herein is intended to means the fluidity of a synthetic resin material. The fluidity is proportional to the MI; that is, the larger the MI, the higher the fluidity.

TABLE 1

| Gate position | Relation between distance from gate to $E_L$ and to $E_R$ | External appearance | Moldability | Molding dimensions |
|---|---|---|---|---|
| $G_1$ | $\Sigma_1 L < \Sigma_1 R$ | — | — | — |
| $G_2$ | $\Sigma_2 L < \Sigma_2 R$ | — | — | — |
| $G_3$ | $\Sigma_3 L < \Sigma_3 R$ | — | — | — |
| $G_4$ | $\Sigma_4 L < \Sigma_4 R$ | Δ | O | O |
| $G_5$ | $\Sigma_5 L < \Sigma_5 R$ | Δ | O | O |
| $G_6$ | $\Sigma_6 L < \Sigma_6 R$ | O | O | O |
| $G_7$ | $\Sigma_7 L > \Sigma_7 R$ | O | O | O |
| $G_8$ | $\Sigma_8 L > \Sigma_8 R$ | Δ | Δ | X |
| $G_9$ | $\Sigma_9 L > \Sigma_9 R$ | — | — | — |

As is apparent from Table 1, the external appearance, the moldability, and the molding dimensions are excellent when the distance from the gate to the right front corner $E_R$ is substantially equal to the distance from the gate to the left front corner $E_L$.

The following Table 2 indicates the results of evaluation in the case where a synthetic resin material with MI=60 was injected into the metal mold:

TABLE 2

| Gate position | Relation between distance from gate to $E_L$ and to $E_R$ | External appearance | Moldability | Molding dimensions |
|---|---|---|---|---|
| $G_1$ | $\Sigma_1 L < \Sigma_1 R$ | X | O | X |
| $G_2$ | $\Sigma_2 L < \Sigma_2 R$ | X | O | Δ |
| $G_3$ | $\Sigma_3 L < \Sigma_3 R$ | Δ | O | O |
| $G_4$ | $\Sigma_4 L < \Sigma_4 R$ | O | O | O |

TABLE 2-continued $$(MI = 60)$$

| Gate position | Relation between distance from gate to $E_L$ and to $E_R$ | External appearance | Moldability | Molding dimensions |
|---|---|---|---|---|
| $G_5$ | $\Sigma_5L < \Sigma_5R$ | ◯ | ◯ | ◯ |
| $G_6$ | $\Sigma_6L < \Sigma_6R$ | ◯ | ◯ | ◯ |
| $G_7$ | $\Sigma_7L > \Sigma_7R$ | ◯ | ◯ | △ |
| $G_8$ | $\Sigma_8L > \Sigma_8R$ | △ | ◯ | △ |
| $G_9$ | $\Sigma_9L > \Sigma_9R$ | X | ◯ | X |

Table 2 also reveals the fact that the external appearance, the moldability, and the molding dimension are satisfactory when the distance from the gate to the right front corner $E_R$ is substantially equal to the distance from the gate to the left front corner $E_L$.

As is seen from the above-described results of evaluation, in the case where the gate is provided at the position where the distance from the gate to the right front corner $E_R$ is equal to the distance from the gate to the left front corner $E_L$, the synthetic resin material is uniformly spread in the mold cavity when injected thereinto, so that the resultant shutter is uniform in thickness and free from shrinkage cavities.

While the method of the invention has been described with reference to the formation of the shutter of a magnetic disc cartridge, it should be noted that the invention is not limited thereto or thereby. That is, the method of the invention is equally applicable to the formation of other plastic articles which have surfaces which are asymmetrical between the right and left halves.

The present invention will now be described in detail hereinafter with reference to FIGS. 5 to 7 of the accompanying drawings, which illustrate a disc cartridge produced in accordance with a preferred embodiment of the present invention.

Figure 3:
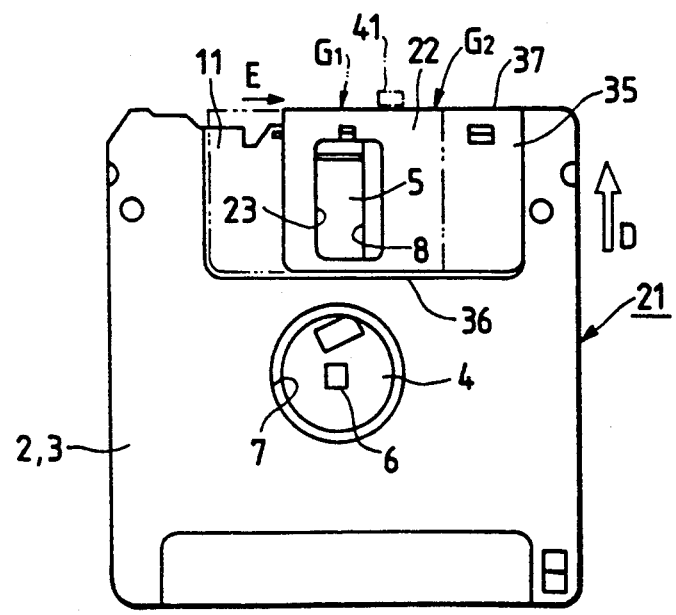
FIG. 3 is a plan view of a conventional 3.5 inch micro floppy disc.
Figure 5:
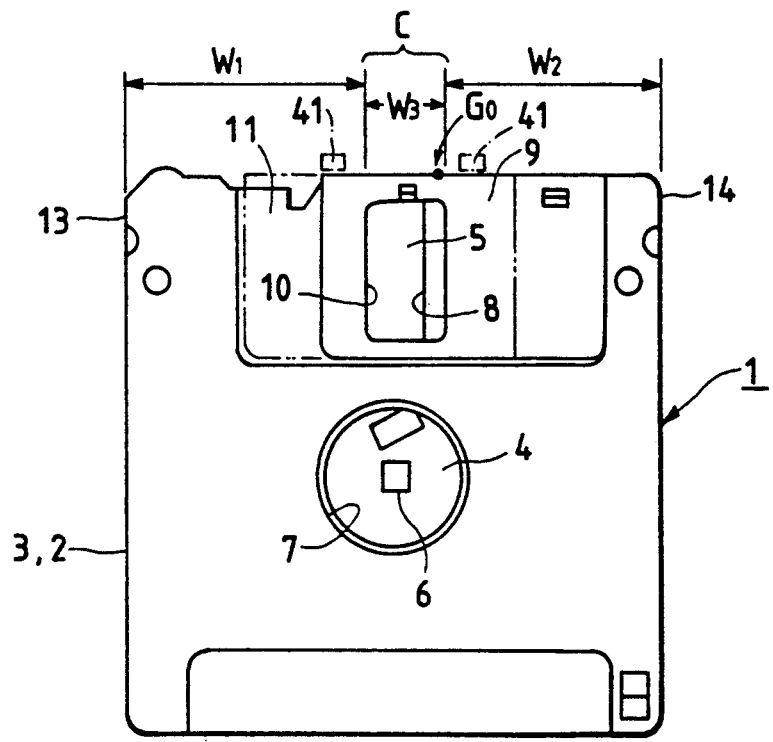
FIG. 5 is a plan view of a 3.5 inch micro floppy disc cartridge produced in accordance with a preferred embodiment of the present invention, particularly illustrating the overall structure of the micro floppy disc cartridge.
Figure 6:
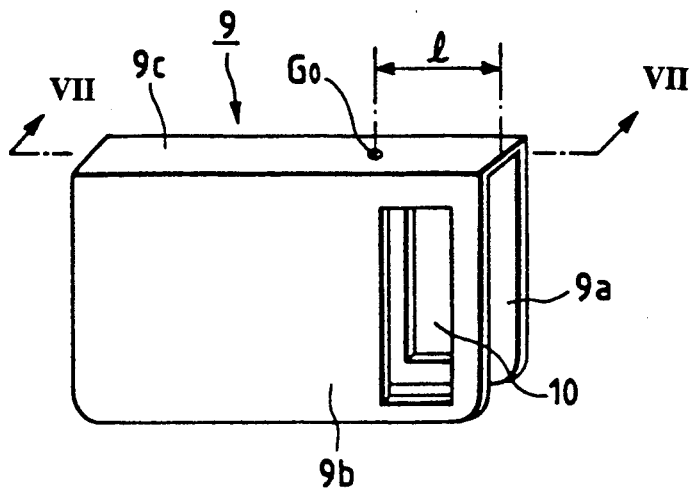
FIG. 6 is a perspective view of a shutter slidably mounted on the micro floppy disc cartridge according to the present invention.
Figure 7:
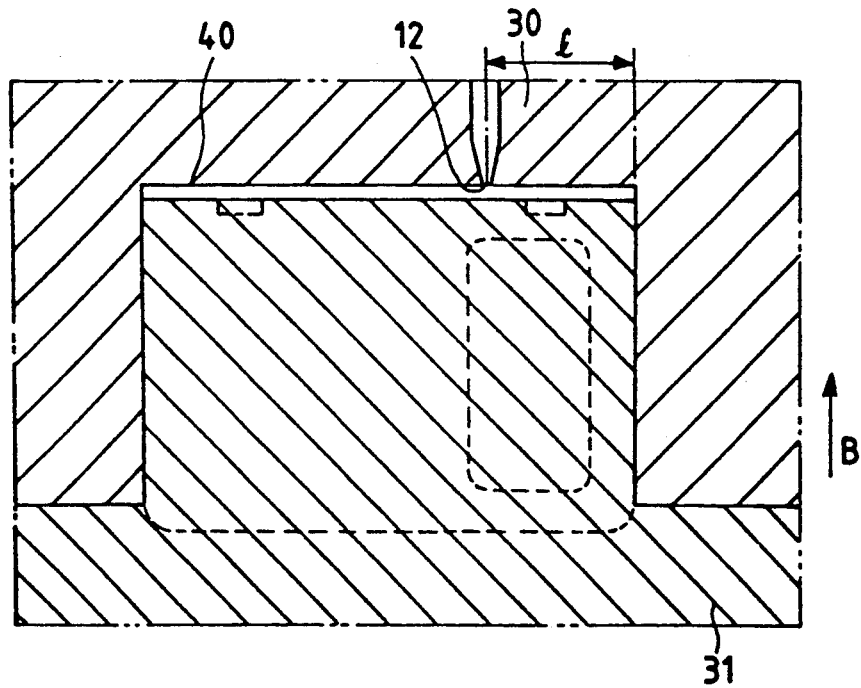
FIG. 7 is a sectional view of a mold usable for molding the shutter shown in FIG. 6, particularly illustrating a sectioned structure taken along a line VII—VII in FIG. 6.

As shown in FIGS. 5-7, a micro floppy disc cartridge 1 is constructed such that a magnetic disc 5 is rotatably received in upper and lower rectangular half shells 2 and 3 which are molded using an acrylonitrile-butadiene-styrene resin or the like in the same manner as the conventional disc cartridge described above with reference to FIG. 3. The magnetic disc 5 is a flexible magnetic recording medium which has a magnetic layer uniformly formed on the surface of a circular disc-shaped film base made of a high molecular material. In addition, a ring-shaped center core 4 is fixedly fitted to a circular opening formed at the central part of the magnetic disc 5. An opening 7 is formed at the central part of the lower half shell 3 of the cartridge 1 so as to allow a motor shaft to be inserted into a substantially square hole 6 formed at the central part of the center core 4. Additionally, magnetic head insert opening portions 8, each opened forwardly of the cartridge 1, are formed on the upper and lower half shells 2 and 3 on the forward side of the cartridge 1 so as to allow a magnetic head and a head pad to be introduced into the magnetic head insert opening portions 8 for writing or reading information signals using the magnetic disc 5.

To reliably prevent introduction of dust or the like into the interior of the cartridge 1 via the magnetic head insert opening portions 8 as well as adhesive deposition of the dust or the like on the magnetic disc 5, the cartridge 1 is provided with a slidable type shutter 9 for opening and closing the magnetic head insert opening portions 8.

As shown in FIG. 6, the shutter 9 is molded of a synthetic resin such that an upper main plate 9a, a lower main plate 9b and a coupling plate 9c adapted to connect the upper main plate 9a to the lower main plate 9b via the coupling plate 9c are integrated with each other while exhibiting an U-shaped cross-sectional contour. To ensure that the magnetic head insert openings 8 are opened and the magnetic disc 5 is exposed to the outside when the cartridge 1 is in use, opening portions 10 are formed on the upper and lower main plates 9a and 9b. As shown in FIG. 7, a mold for molding the shutter 9 is composed of a stationary die half 30 and a movable die half 31 with a hollow cavity 40 therebetween. A molten resin is injected into the hollow cavity 40 between the two die halves 30 and 31 through a gate 12 located at a position corresponding to the outer surface of the coupling plate 9c. According to this embodiment of the present invention, a significant feature of the gate 12 resides in that the gate 12 is formed at a position removed from the side end of the shutter 9 by a specific distance 1.

As shown in FIG. 5, this specific distance 1 is determined such that while the shutter 9 is slidably mounted on the cartridge 1, a raised gate mark $G_0$ is located at a position offset not only toward the interior of the cartridge 1 (in the rightward direction) in excess of a first distance $W_1$ as measured from a cartridge side end 13 in the direction of slidable displacement of the shutter 9, but also toward the interior of the cartridge 1 (in the leftward direction) in excess of a second distance $W_2$ as measured from the opposite cartridge side end 14. In other words, the specific distances are determined such that the raised gate mark $G_0$ is always located within the range represented by an effective opening region C (having a width $W_3$) of the magnetic head insert opening portions 8. As a matter of course the effective opening region C is selected from the proposed position according to the embodiment of the invention.

According to this embodiment of the present invention, the first distance $W_1$ is set to about 35 mm and the second distance $W_2$ is set to about 45 mm.

The effective opening region C is a region substantially corresponding to the magnetic head insert opening portions 8. Specifically, the effective opening region C is a region slightly larger than the width of each of the magnetic head insert opening portions 8 as seen in the direction of slidable displacement of the shutter 9. Since the magnetic head is inserted into the magnetic head insert opening portions 8 located within the effective opening range C for reproducing recorded information, the magnetic head and its peripheral members are arranged within the effective opening region C, and, moreover, position-determining projections 41 do not remain within the effective opening region C. Thus, the occurrence of rubbing contact of the raised gate mark $G_0$ with the position-determining projections 41 can be avoided entirely. Moreover, in a case where the cartridge in accordance with the present embodiment of the invention is employed for a 3.5 inch micro floppy disc, the width $W_3$ of the effective opening region C is determined within the range of about 20 mm, and, therefore, the specific distance A is set to a size within the range of 15 to 25 mm.

The shutter 9 is slidably mounted within a slidable displacement region 11 determined such that slidable displacement of projections projected inside the shutter 9 is properly guided along guide grooves formed along the side edge of the lower half shell 3 on the outer surface of the same. Also, it should be noted that the shutter 9 is normally biased by a spring member so as to allow the magnetic head insert opening portions 8 to be closed with the shutter 9 when the cartridge is not in use.

A resin having a high mechanical strength such as a polyoxymethylene resin or the like is preferably employed as a the raw material for molding the shutter 9.

While, the present invention has been described above with respect to a preferred embodiment thereof wherein the disc cartridge is employed for a 3.5 inch micro floppy disc, it should be noted that the present invention may be applied to other types of disc cartridge such as those mentioned above. Of course, the specific distance and the effective opening region C may adequately be changed depending on the size of the cartridge.

As is apparent from the above description, according to the present invention, the cartridge is constructed such that the range where a gate for performing an injection molding operation with a synthetic resin is formed on the outer surface of the disc cartridge always remains within the effective opening range, namely, the substantial range for the magnetic head insert opening portions corresponding to the position where a recording/reproducing head is disposed. With this construction, a raised gate mark on the shutter is always located at the location offset from the region where position-determining projections come into contact with the side edge of the cartridge, whereby the occurrence of rubbing contact of the position-determining projections with the raised gate mark can be prevented reliably. In addition, there does not arise a malfunction that the raised gate mark is undesirably scraped due to the aforementioned rubbing contact, and, moreover, smooth slidable displacement of the shutter in the opening direction is assured.

Consequently, according to the present invention, smooth slidable displacement of the shutter in the opening direction is assured, even though a gate is formed at the position on the side plate of the shutter and a raised gate mark is incompletely removed from the shutter molded of a synthetic resin. Conclusively, the present invention provides a cartridge including a shutter molded of a synthetic resin wherein smooth slidable displacement of the shutter in the opening direction is assured.

What is claimed is:

1. In a disc cartridge including case having a disc-shaped recording medium received therein so as to allow predetermined information signals to be recorded and reproduced, and a shutter injection-molded from a synthetic resin to slidably open and close an opening portion formed on said cartridge case so as to allow at least a part of said disc-shaped recording medium to be exposed to the outside, the improvement wherein said shutter comprises an upper main plate, a lower main plate, and a coupling plate connecting said upper main plate to said lower main plate via said coupling plate in an integrally molded state, said shutter having a U-shaped cross-section contour to hold said cartridge case in a clamped state, a raised gate mark created by an injection molding operation that forms said shutter, said raised gate mark being formed on an outer surface of said coupling plate, so that a distance from said raised gate mark to points on right halves of said upper and lower main plates which are farthest from said raised gate mark being substantially equal to a distance from said raised gate mark to points on left halves of said upper and lower main plates which are farthest from said raised gate mark, said opening portion having a width dimension parallel to a length dimension of said coupling plate wherein when said width dimension is orthogonally projected onto said coupling plate it defines a linear region along said length dimension of said coupling plate, the position of said raised gate mark being confined within said linear region of said coupling plate such that the gate mark remains opposite said opening portion as said shutter slidably opens and closes said opening portion, said region defining an effective opening region.

2. The disc cartridge of claim 1, wherein said position of said raised gate mark is within a range between 35 mm from one side of said cartridge and 45 from an opposed side of said cartridge.

3. The disc cartridge of claim 1, wherein said shutter is molded from polyoxymethylene resin.

* * * * *